United States Patent [19]

Wilson

[11] 3,968,407
[45] July 6, 1976

[54] REDUNDANT INTRINSIC SAFETY BARRIER

[75] Inventor: Homer M. Wilson, Houston, Tex.

[73] Assignee: Petrolite Corporation

[22] Filed: Sept. 8, 1975

[21] Appl. No.: 611,095

Related U.S. Application Data

[63] Continuation of Ser. No. 455,173, March 27, 1974, abandoned.

[52] U.S. Cl. .................................. 317/16; 317/31; 317/33 SC; 317/50; 307/93; 323/22 SC
[51] Int. Cl.² .................. H02H 3/20; H02H 3/08
[58] Field of Search ....... 317/16, 31, 33 VR, 33 SC, 317/50; 307/202 R, 237, 252 T, 252 B, 252 P, 285, 93; 323/22 SC

[56] References Cited
UNITED STATES PATENTS
3,878,434  4/1975  Voorhoeve ........................ 317/16

Primary Examiner—J D Miller
Assistant Examiner—Patrick R. Salce
Attorney, Agent, or Firm—Emil J. Bednar

[57] ABSTRACT

A redundant intrinsic safety barrier with input and output terminals and circuit common connecting a plurality of signal lines. Input and output directors connect respectively to the input and output terminals. The directors are connected to each other and each of the directors provides dual unidirectional current paths from one of the input or output terminals to circuit common. Unidirectional current latching means in each current path provide a high impedance gap for voltage magnitudes below a predetermined value, and the latching means are self-latched into a low impedance bridge for current magnitudes above the predetermined value. Fused means in series with the input and output directors open the circuit therebetween when current in a certain time period exceeds the predetermined value by a certain selected amount.

6 Claims, 3 Drawing Figures

REDUNDANT INTRINSIC SAFETY BARRIER

This is a continuation of application Ser. No. 455,173, filed Mar. 27, 1974, now abandoned.

BACKGROUND OF THE INVENTION

1. Field of the Invention

This invention relates to electrical apparatus for the measuring and testing of signal circuits, and it relates particularly to an intrinsic safety barrier which connects to signal lines for preventing excessive voltages or currents thereon.

2. Description of the Prior Art

Instrumentation within processing facilities, such as chemical and oil refining complexes, are now designed to include various devices for providing intrinsically safe installations. Severe engineering and operating parameters are encountered in the design of such systems. The various systems must permit advanced technology signal transmission and processing capabilities while yet preventing the passage of excess voltages and current which could cause ignition problems within flammable or explosive atmospheres. In addition, the Occupational Safety and Health Act (OSHA) has made mandatory the use of intrinsically safe installations for the protection of property and operating personnel. Generally, the components of the intrinsically safe installations must be tested and certified safe in hazardous environments. For example, the hazardous area to be protected can be the operational portions of an oil refinery contaminated with various gases creating flammable or explosive atmospheres. Instrumentation may be placed within a remote control room, but an intrinsically safe installation requires some type of barrier to be placed between the control room (safe area) and the operating facility (hazardous area) so that no excessive voltages or currents can cause an explosion outside of the control room.

The design of the instrument system must be such that the instrumentation circuit in the hazardous area cannot release sufficient energy under any combination of conditions to ignite the explosive atmosphere. Irrespective of malfunctions or improper installation or servicing, the instrument system must failsafe, and in no event can it possibly be so mismanaged as to create an explosion. Most intrinsically safe systems use circuit elements which place absolute limits on currents and voltages available at any instant in a hazardous area. Various circuit components prevent accumulation and release of sufficient energy from capacitance and inductance effects so as to cause an explosion. The low energy signal levels of solid state instrumentation devices make difficult the design of an intrinsically safe instrumentation system for them. For example, reference may be taken to U.S. Pat. No. 3,717,566, which describes an industrial model of an automatic corrosion ratemeter for determining the corrosion occurring at remotely placed probes. The instrumentation package is placed within a control room and conductors extend for some distance to various probes placed at sensing locations within the processing streams. For example, the probes may be located at distances of up to one mile from the instrumentation package. The signal levels upon the various conductors are in the range of not over several hundred millivolts and several milliamperes. These signal levels are very low, and they are not close to the magnitudes that can create the ignition of an explosive environment unless ignited by malfunctioning instrumentation. For this purpose, it is required to design a barrier which may be interposed between the instrumentation and the conductors which extend to the remotely positioned probes without deterioration of signal levels.

Prior art barriers have been known which employ voltage limiting zener diodes connected redundantly, e.g., in parallel, with series resistors for current limiting and test purposes. In addition, various unidirectional devices such as diodes can be employed for purposes of limiting both voltages and currents. However, these systems all had undesired effects in that they effected the small signal levels encountered in the normal operation of highly sensitive instruments such as the mentioned corrosion ratemeter. For example, the zener diode has some conduction even at small potential and current levels other than where its limiting action is desired. Also, most barriers presently available are not bipolar and can handle only one polarity of potential with respect to ground potential.

The above deficiences in known systems led to the development of a redundant intrinsic safety barrier of the present invention. This safety barrier employs a plurality of elements such that, within predetermined limits, voltages and current excesses may be reduced to levels at circuit common by operation of its various elements. Should voltages or currents above the predetermined operating levels be encountered, these elements self-latch into a condition causing a series-connected fuse to open and thereby completely provide a failsafe operation of the barrier. Naturally, the present safety barrier does not influence the normal operation at low signal levels of highly sensitive instrumentation such as the mentioned corrosion ratemeter. However, should an unsafe operating condition through excess voltages or currents occur, the device will either automatically limit them or cause an automatic fuse failure to open the signal circuits so that there is no possibility of the appearance of such excess voltage and current appearing in a hazardous location where a probe is located.

SUMMARY OF THE INVENTION

In accordance with this invention, there is provided a redundant intrinsic safety barrier comprising at least one signal line including input and output terminals and circuit common. Input and output directors connect respectively to the input and output terminals. Each of these directors provides dual unidirectional current paths between one of the input and output terminals and circuit common. Unidirectional current latching means connect in each current path and provide a high impedance gap in the current path for voltage magnitudes below a predetermined value. The latching means become self-latched into a low impedance bridge in a current path to circuit common for voltage magnitudes above the predetermined value. Fused means in series with the input and output directors open the circuit between the input and output terminals when current in a certain time period exceeds the predetermined value by a certain selected amount.

DESCRIPTION OF SPECIFIC EMBODIMENTS

Figure 1:
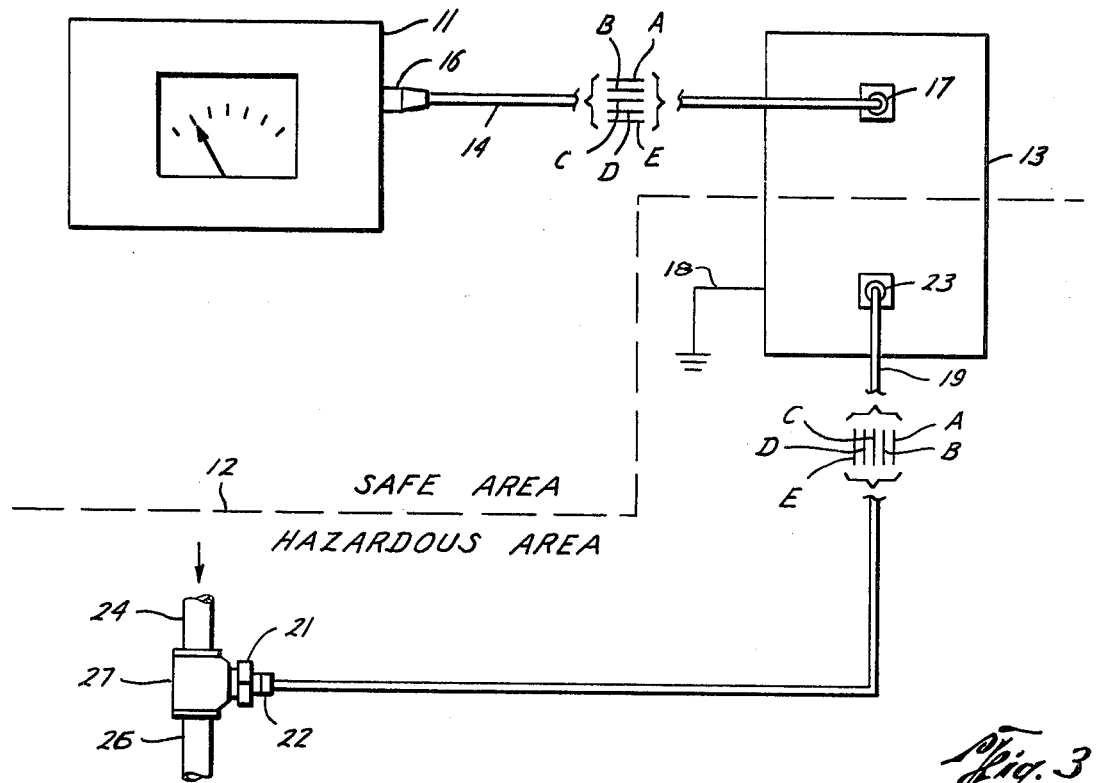
FIG. 1 is a schematic illustration of the connection of an automatic corrosion ratemeter through an intrinsic safety barrier and interconnecting electrical conduits to a remotely located probe.

Referring now to FIG. 1, there is shown an intrinsically safe instrumentation system including an instrument 11 which may be a corrosion ratemeter as illustrated in U.S. Pat. No. 3,717,566. The instrument 11 is located with the "safe area" side of partition 12. The instrument 11 connects to the intrinsically safe barrier 13 of the present invention by a multiconductor electrical cable 14. The electrical cable 14 may contain any number of conductors but for present purposes includes five conductors designated A, B, C, D, and E. The cable 14 carries male and female connectors 16 and 17 which provide the desired interconnections between the mentioned devices. The barrier 13 is connected to earth ground 18. The barrier 13 interconnects by a cable 19 with a remotely positioned probe 21 which is located in the "hazardous area" side of the partition 12. The cable 19 carries connectors 22 and 23 for interconnection between the barrier 13 and the probe 21. Probe 21 may be of any desired configuration and construction. Preferably, the probe is of the type illustrated in U.S. Pat. 3,558,462, which provides exemplary service in corrosion monitoring systems. The probe carries a plurality of electrodes interconnected with the conductors A, B, C, D, and E, in cable 19 which conductors correspond to the conductors of cable 14. The probe 21 monitors fluid flowing within the conduit system formed of pipes 24 and 26, which pipes are joined by tee 27.

Thus, fluid flowing through the piping system are monitored by the probe 21 through the use of interconnecting cables to the instrument 11. For purposes of operation of the instrument 11, the conductors carry signal potentials of, for example, 500 millivolts (max.) and at current demands of approximately 10 milliamps (max.). The barrier 13 provides a safe interconnection between the instrumentation in a safe and hazardous area. For example, the failsafe operation of the barrier 13 can totally disconnect electrically the cable 19 from the instrument 11 at the barrier 13 whenever any voltages or currents in the safe area appear on any of the conductors in excess of 30 volts and 100 milliamps and without the voltages and currents in the hazardous area exceeding 15 volts and 28 milliamperes. Lesser potentials above 15 volts d.c. and 28 milliamps are reduced to near circuit common potential without any injurious potentials or currents reaching the probe 21.

Figure 2:
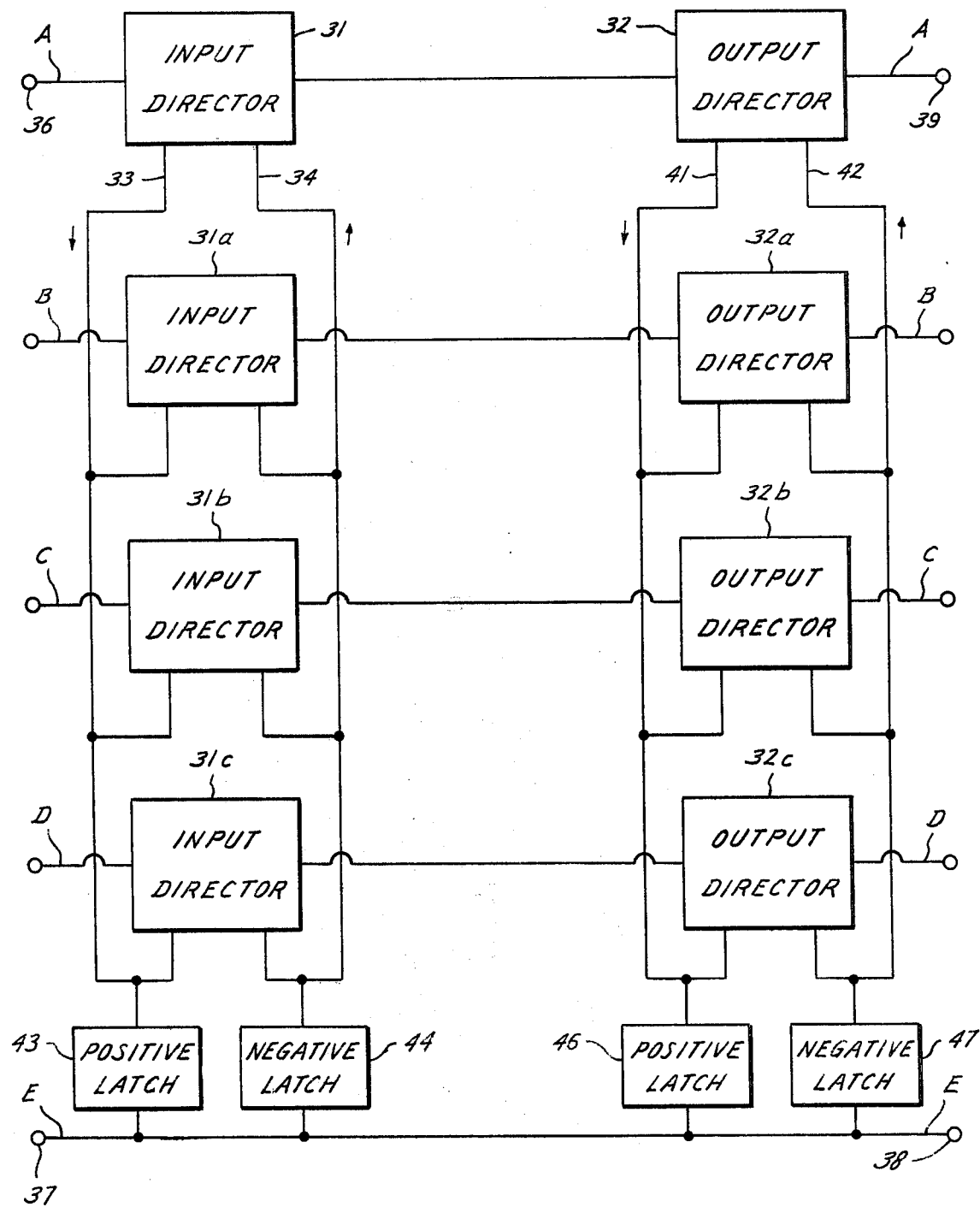
FIG. 2 is a schematic of the intrinsically safe barrier shown in FIG. 1, connected to four signal lines.

Referring now to FIG. 2, the barrier 13 is constructed of a plurality of elements which are interconnected in functioning and result to provide safe operation for the instrumentation described in FIG. 1. More particularly, the barrier 13 includes for each of the conductors A, B, C, and D an input director and an output director. The input director 31 provides dual unidirectional current paths 33 and 34 between the input terminal 36 of conductor A and the circuit common of conductor E having a terminal 37. The current flow in the unidirectional current paths 33 and 34 is opposite in direction as indicated by the arrows. In a like manner, the output director 32 connects to an output terminal 39 of the conductor A and provides dual unidirectional current paths 41 and 42 to circuit common at conductor E. The conductor E has an output terminal 38 for interconnection into the present system. The current flow is in the opposite direction in the unidirectional current paths 41 and 42 and is indicated by arrows. The input and output directors for conductors B, C, and D are indicated by subscript $a$, e.g., 31$a$ and 32$a$. Although a plurality of signal lines are shown, the barrier 13 may be used to protect a single conductor A.

The input director 31 also has the unidirectional current paths 33 and 34 interconnected through a positive latch 43 and a negative latch 44 to the conductor E. Likewise, the output director 32 also has the unidirectional current paths 41 and 42 connected through a positive latch 46 and a negative latch 47, respectively, to circuit common at conductor E. As seen in momentary reference to FIG. 2, each of the remaining conductors B, C, and D have individual input and output directors which are connected to the unidirectional current paths 33, 34, 41, and 42, respectively. These input and output directors also connect in common through the positive and negative latches 43 and 44, and 46 and 47, respectively, to circuit common at conductor E. The function of the unidirectional current latches is to provide a high impedance gap in the current paths 33, 34, 41, and 42 for voltage magnitudes below a predetermined value. For example, a high impedance gap exists for all current magnitudes passing in conductor A between input terminal 36 and output terminal 39 that result in 12 volts or less across any of the latches and 28 milliamps through these latches. At voltage levels above such predetermined value in the latches, the positive and negative latches 43, 44, 46, and 47, respectively, are self-latched into a low impedance bridge in these current paths to ciruit common. Thus, should excessive current appear upon the conductor A, the excess current will be diverted through the unidirectional current paths and the positive or negative latches to the conductor E which is circuit common.

Figure 3:
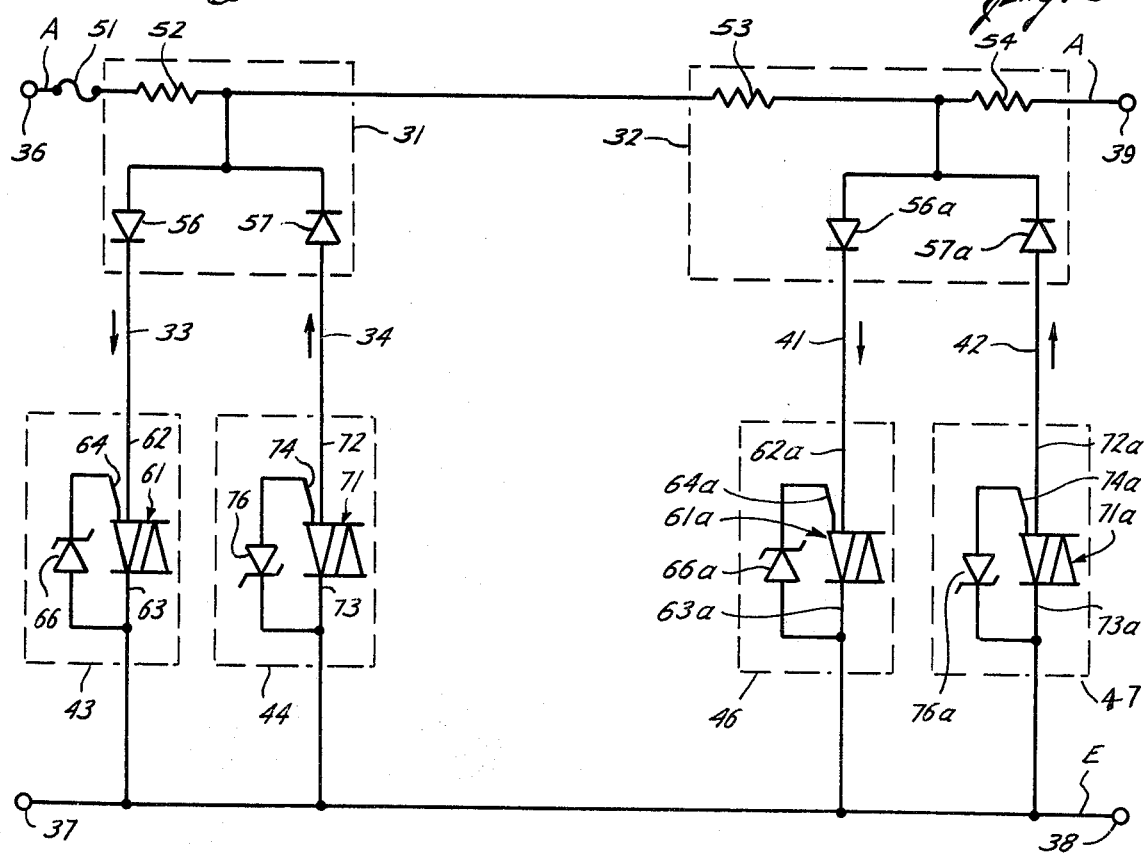
FIG. 3 is a block schematic of the intrinsically safe barrier connected to one signal line.

In FIG. 3 is shown the arrangement of the input and output directors 31 and 32 with the positive and negative latches 43 and 44, and 46 and 47, respectively. A fuse 51 and resistors 52, 53, and 54 are in series with the conductor A between input terminal 36 and output terminal 39. The purpose of these resistors will be more fully explained as the present discussion continues. The input director 31 includes paralleled diodes 56 and 57. These diodes provide for dual unidirectional current paths 33 and 34 to the conductor E. The diodes are preferably selected so as to have a very low forward voltage drop with a very high reverse resistance.

The positive latch 43 provides a very high impedance gap (e.g., 100 megohms) in the current path 33 for current magnitudes below a predetermined value. In addition, the positive latch 43 self-latches into a low impedance bridge (e.g., 1–5 ohms) whenever the current magnitude in the current path 33 is above the predetermined value. Any suitable means may be employed for this purpose but preferably the following arrangement is employed to good advantage. The positive latch 33 includes a triac 61 having a first anode 62 connected to the diode 56, a second anode 63 connected to the conductor E, and a signal gate 64 adapted to receive a gate current signal. The triac 61 is in series with the input director 31 and conductor E. More particularly, the signal gate 64 connects to the cathode of a zener diode 66 which also connects at its anode to the anode 63 of the triac 61. Only when voltage upon the unidirectional current path 33 is above a certain magnitude can a gate current flow through the signal gate 64, the zener 66 and the conductor E. The gate current places the triac 61 into a conductive state where it will remain as long as the conducted current is maintained. Since the zener diode 66 conducts reverse at a known low level potential approximately 12 volts in this case, the current path 33 can be adjusted for the threshold conduction of the triac 61 for a predetermined potential. The diode 56 prevents any possibility of the zener diode 66 being overdriven into a forward diode conduction state.

The zener diode 66 holds a signal gate 64 of the triac 61 at zero current until a certain potential is established thereacross. This potential provides the necessary gate current to the anode 62 of the triac 61 to place it into a conductive state. With this arrangement, the resistor 52 provides for overcurrent protection. For example, assume that the circuitry is arranged to be activated by a greater than 12-volt d.c. signal appearing at input terminal 36. The potential acting through the resistor 52 produces a unidirectional current flow (assuming polarity) through the unidirectional current path 33 and activates the triac 61 into a conductive state. At this time, the triac 61 has very low internal impedance at its conductive state and reduces the voltage at the output terminal 39 by its clamping or self-latching action to approximately 1½ volts d.c. above the potential of conductor E. Thus, excess potentials below a predetermined value are clamped to within 1½ volts potential above circuit common at the potential of conductor E.

The unidirectional current path 34 is arranged in a similar manner in having a triac 71 connected with one anode 72 to the diode 57 and with its second anode 73 connected to the conductor E. The zener diode 76 connects between the signal gate 74 and the anode 73 of the triac 71. Thus, this arrangement will function exactly as that described for the triac 61, but with current flowing in an opposite direction caused by a polarity change of voltage at the terminal 36.

Refering now to the output director 32, the elements are identical as found with the input director 31 and the diodes are labeled with the subscript $a$ to indicate their corresponding relationship. For example, diode 56$a$ is the complement of diode 56 of the input director 31. Thus, the subscript elements $a$ perform the identical function for the positive and negative latches 46 and 47 as was described for the complements in the positive and negative latches 43 and 44, respectively.

The output director 32 and the positive and negative latches 46 and 47 come into action whenever the current is excessively greater by a certain magnitude than the predetermined value in the described arrangement. For example, at excessive voltages or currents, one or the other of the current paths 41 and 42 is clamped to 1½ volts above the potential of conductor E. At this time, the current flow through the resistor 53 causes a relatively large potential drop to protect the terminal 39 from any excessive current flow. The terminal 39 is isolated as the voltage drop of the resistors 52 and 53 increases by excessive current. The resistors 52 and 53 provide an impedance to move terminal 39 voltagewise away from terminal 36 and protect terminal 36 from excessive potentials. In the event that excess potential appears at the terminal 36, the action of the input and output directors 31 and 32 with their corresponding positive and negative latches cause such excessive currents to flow through the resistors 52 and 53 that the fuse 51 in series with terminal 36 opens. At this time, the barrier 13 has opened the circuit in conductor A and no excess current or potential can reach the probe 21 from the instrument 11. An additional resistor 54 may be placed in series between terminal 39 and the output director 32 for additional current limiting. The resistors 52, 53, and 54 serve also an additional function in branching of currents so that the integrity of the barrier 13 may be determined without activating its protective features. For example, a potential may be applied solely to terminal 39 or 36 and the current flows through the other terminal and the potential thereat may be measured. If desired, differential potentials may be applied between the terminals 36 and 39 and the resultant current flow indicates integrity of the various sections of the device. Thus, not only is there provided a redundant intrinsic safety barrier which is well able to protect devices in an explosive atmosphere in a hazardous area, but there is also provided circuitry whereby the integrity of the barrier 13 can be determined without destroying the effectiveness of such items.

In the event a potential would appear at the terminal 39 the device would operate in a similar fashion, but in reverse circuit functioning.

Various changes and alterations will be apparent to those skilled in the art of the circuitry of the present redundant intrinsically safe barrier of the present invention. It is intended that such changes and alterations, which do not depart from the spirit of the present invention, be included within the scope of the presently appended claims. The appended claims define the present invention; the foregoing description is employed for setting forth the present invention embodiments as illustrative in nature.

What is claimed:

1. A redundant intrinsic safety barrier interposed within a signal line carrying bipolar d.c. voltage signals and bidirectional current flows whereby power transmitted on the signal line is limited to a safe magnitude irrespective of the voltage polarity of the signals or current flow direction, the barrier comprising:
   a. a signal conductor including first and second terminals connectable into the signal line, and a circuit common;
   b. fuse means and first, second and third resistances series connected in said signal conductor between said first and second terminals;
   c. a first pair of unidirectional current circuits of opposite flow directions being parallel connected between the junction of said first and second resistances in said signal conductor and circuit common;
   d. a second pair of unidirectional current circuits of opposite flow directions being parallel connected between the junctions of said second and third resistances in said signal conductor and circuit common;
   e. said unidirectional current circuits having substantially identical, like components, each said unidirectional current circuit containing a rectifier means in series with the main terminals of a triac and circuit common, and a zener diode in series between the gate of said triac and circuit common, and said rectifier means and zener diode both connected with like anodes or cathodes as the case may be to said signal conductor and circuit common, respectively;

f. each pair of said unidirectional current circuits having said rectifier means and zener diodes connected in parallel but with reverse polarity; and g. said first and third resistances providing for current limiting functions in said signal conductor whereby excessive bidirectional current flows on said signal conductor or bipolar voltages above the predetermined magnitude at either said first and second terminals will bias into low impedance conduction one of said corresponding triacs in said first and second pairs of said unidirectional current circuits to provide redundant power limiting in addition to said fuse means.

2. The safety barrier of claim 1 wherein said first and third resistances upon excessive current flow on said signal conductor produce voltages above the predetermined magnitude.

3. The safety barrier of claim 2 wherein said first, second and third resistances have sufficiently different values that induced current branches into several known current paths for varifying the integrity of said safety barrier without fuse means clearing.

4. A redundant intrinsic safety barrier interposed within a plurality of signal lines, each of the signal lines carrying bipolar d.c. voltage signals whereby power transmitted on each signal line is limited to the same safe magnitude irrespective of the voltage signal polarity or current flow direction, the barrier comprising:

a. a plurality of signal lines and each said signal line having a signal conductor including first and second terminals, and fuse means and first, second and third resistance connected in series between said first and second terminals;

b. a circuit common connectible to earth ground for all of said signal lines;

c. a first pair of unidirectional current circuits of opposite flow directions being parallel connected between the junction of said first and second resistances in each said signal conductor and said circuit common;

d. a second pair of unidirectional current circuits of opposite flow directions being parallel connected between the junction of said second and third resistances in each said signal conductor and said circuit common;

e. said unidirectional circuits having substantially identical, like components and containing a rectifier means in series with a current director common to all said signal conductors;

f. each said current director containing a triac with main terminals in series with said rectifier means and said circuit common, and a zener diode in series between a gate of said triac and said circuit common, and said rectifier means and zener diode both connected with like anodes or cathodes as the case may be to said signal conductor and circuit common, respectively, in each said unidirectional current circuit;

g. each pair of said unidirectional current circuits having said rectifier means and zener diodes connected in parallel but with reverse polarity; and h. said first and third resistances providing for current limiting functions in each said signal conductor whereby excessive bidirectional current flows on any said signal conductor or bipolar voltages above a predetermined magnitude at either said first and second terminals will bias into low impedance conduction one corresponding triac in said first and second pairs of said unidirectional current circuits to provide redundant power limiting in addition to said fuse means simultaneously in all said signal conductors.

5. The safety barrier of claim 4 wherein said first and third resistances upon excessive current flow on said signal conductor including said resistances produces voltages above the predetermined magnitude.

6. The safety barrier of claim 5 wherein said first, second and third resistances in each signal conductor have sufficiently different values that induced current branches into several known current paths for varifying the integrity of said safety barrier without fuse means clearing.

* * * * *